US011224997B2

(12) United States Patent
Janssen et al.

(10) Patent No.: US 11,224,997 B2
(45) Date of Patent: Jan. 18, 2022

(54) PLASTIC MATERIAL FOR INDUSTRIAL FORMER

(71) Applicant: DSM IP Assets B.V., Heerlen (NL)

(72) Inventors: Pim Gerard Anton Janssen, Echt (NL); Arun Anantrao Kulkarni, Echt (NL); Konraad Albert Louise Hector Dullaert, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 747 days.

(21) Appl. No.: 15/537,747

(22) PCT Filed: Dec. 17, 2015

(86) PCT No.: PCT/EP2015/080235
§ 371 (c)(1),
(2) Date: Jun. 19, 2017

(87) PCT Pub. No.: WO2016/097152
PCT Pub. Date: Jun. 23, 2016

(65) Prior Publication Data
US 2019/0022898 A1 Jan. 24, 2019

(30) Foreign Application Priority Data

Dec. 17, 2014 (EP) .................................. 14198536

(51) Int. Cl.
| B29C 33/40 | (2006.01) |
| B29C 41/14 | (2006.01) |
| B29C 41/38 | (2006.01) |
| C08G 69/26 | (2006.01) |
| C08L 77/06 | (2006.01) |
| C08K 7/14 | (2006.01) |
| C08L 77/00 | (2006.01) |
| C08L 77/10 | (2006.01) |
| B29C 33/38 | (2006.01) |
| B29K 309/08 | (2006.01) |

(52) U.S. Cl.
CPC .......... *B29C 33/40* (2013.01); *B29C 33/3842* (2013.01); *B29C 41/14* (2013.01); *B29C 41/38* (2013.01); *C08G 69/265* (2013.01); *C08K 7/14* (2013.01); *C08L 77/00* (2013.01); *C08L 77/06* (2013.01); *C08L 77/10* (2013.01); *B29K 2309/08* (2013.01); *B29K 2877/00* (2013.01); *B29K 2881/00* (2013.01)

(58) Field of Classification Search
None
See application file for complete search history.

(56) References Cited

U.S. PATENT DOCUMENTS

| 4,135,867 | A | | 1/1979 | Stockum | |
| 4,329,312 | A | * | 5/1982 | Ganz | ........................ B29C 41/14 |
| | | | | | 2/168 |
| 2002/0173584 | A1 | * | 11/2002 | Ebert | ........................ C08L 77/00 |
| | | | | | 524/538 |
| 2004/0030023 | A1 | | 2/2004 | Buhler et al. | |
| 2006/0029436 | A1 | * | 2/2006 | Toyoda | ................ G03G 9/0827 |
| | | | | | 399/279 |
| 2006/0036044 | A1 | | 2/2006 | Cheng | |
| 2008/0190322 | A1 | * | 8/2008 | Chen | ..................... A61L 29/085 |
| | | | | | 106/218 |
| 2009/0242048 | A1 | * | 10/2009 | Sherman | ................... C12Q 1/04 |
| | | | | | 137/561 R |
| 2010/0233146 | A1 | * | 9/2010 | McDaniel | ................ C09D 5/14 |
| | | | | | 424/94.2 |
| 2010/0249292 | A1 | | 9/2010 | Saga et al. | |
| 2012/0148651 | A1 | * | 6/2012 | Amdur | ................... A01N 25/34 |
| | | | | | 424/409 |
| 2013/0022786 | A1 | | 1/2013 | Topoulos | |
| 2014/0329944 | A1 | * | 11/2014 | Harder | ................... C09K 21/12 |
| | | | | | 524/133 |

FOREIGN PATENT DOCUMENTS

| EP | 0 425 742 | 5/1991 |
| GB | 2 034 629 | 6/1980 |
| TW | 201446162 | 12/2014 |
| WO | WO 2008/131329 | 10/2008 |
| WO | WO 2011/126794 | 10/2011 |

(Continued)

OTHER PUBLICATIONS

"Critical Surface Tension and Contact Angle with Water for Various Polymers", Diversified Enterprises, Year 2009, XP0024741322, Claremont, NH, USA.*
"Typical Room Temperature Properties of Polyphenylene Sulfide (PPS)", Engineering Plastic Products—Stock Shapes for machining, Quadrant Engineering Plastic Products, iapd, XP002741318, Year 1996.*
International Search Report for PCT/EP2015/080235, dated Oct. 19, 2016, 9 pages.
Written Opinion of the ISA for PCT/EP2015/080235, dated Oct. 19, 2016, 10 pages.

(Continued)

*Primary Examiner* — Matthew J Daniels
*Assistant Examiner* — Mohammad M Ameen
(74) *Attorney, Agent, or Firm* — Nixon & Vanderhye P.C.

(57) ABSTRACT

The present invention relates to a plastic material for use in various application. Further, the present invention relates to a plastic material for an industrial former (herein also designated as a mold). Additionally, the present invention relates to a mold made of a plastic material and the method for the manufacture of said mold. Furthermore, the present invention relates to an industrial process using such mold, such as in a process for making rubber goods comprising dipping of a mold into a rubber emulsion, wherein the mold consisting of a plastic material having a surface tension in the range from 25 to 60 mJ/m2 measured according to ASTM standard D-2578/09.

9 Claims, No Drawings

(56) References Cited

FOREIGN PATENT DOCUMENTS

WO WO 2014/148884 9/2014
WO WO-2014-148884 A1 * 9/2014

OTHER PUBLICATIONS

Iapd—International Association of Plastics Distribution.: "Typical Room Temperature Properties of Polyphenylene Sulfide (PPS)", Engineering Plastic Products—*Stock Shapes for Machining, Quadrant Engineering Plastic Products,* URL:http://corpo.polyalto.com/webdocs/555/Copie%20de%20PPS.pdf, (1996) 3 pages.
"Critical Surface Tension and Contact Angle with Water for Various Polymers", *Diversified Enterprises,* URL:http://www.accudynetest.com/polytable_03print.html?sortby=contact_angle, (2009).

* cited by examiner

PLASTIC MATERIAL FOR INDUSTRIAL FORMER

This application is the U.S. national phase of International Application No. PCT/EP2015/080235 filed Dec. 17, 2015 which designated the U.S. and claims priority to EP Patent Application No. 14198536.6 filed Dec. 17, 2014, the entire contents of each of which are hereby incorporated by reference.

The present invention relates to a plastic material for use in various application. Further, the present invention relates to a plastic material for an industrial former (herein also designated as a mold). Additionally, the present invention relates to a mold made of a plastic material and the method for the manufacture of said mold. Furthermore, the present invention relates to an industrial process using such mold.

Plastics are popularly used materials, having a wide range of applications. The variety of plastics provides a wide range of chemical properties and physical properties. Plastics are malleable and can be molded into solid objects of diverse shapes: from the simplest to the most complex shape. Plastics organic polymers of high molecular mass, but they often contain other substances. They may be natural or synthetic, most commonly derived from petrochemicals. Plasticity is the general property of all materials that are able to irreversibly deform without breaking. Plasticity occurs to the degree which defines the class of moldable polymers.

Due to their relatively low cost, ease of manufacture, versatility, and imperviousness to water, plastics are used in an enormous and expanding range of products, from paper clips to aeronautic industry. They have already replaced many traditional materials, such as wood, stone, horn and bone, leather, in most of their former uses. In developed countries, about a third of plastic is used in packaging and another third in buildings such as piping used in plumbing or vinyl siding. Other uses include automobiles, electronics and general industries, such as in furniture and toys. Plastics have many uses in the medical field as well, to include polymer implants, or in the field of plastic surgery ("plastic" surgery herein not referring for use of plastic material, but the more generic meaning of the word plasticity in regards to the reshaping of flesh or bone).

There are two types of plastics: thermoplastics and thermosetting polymers. Thermoplastics are the plastics that do not undergo chemical change in their composition when heated and can be molded again and again. Examples include polyethylene, polypropylene, polystyrene and polyvinyl chloride. Thermoplastics have a specific molecular weight and thermosets are assumed to have infinite molecular weight. Thermosets can melt and take shape once; after they have solidified, they stay solid. In the thermosetting process, a chemical reaction occurs that is irreversible. The vulcanization of rubber is a thermosetting process.

Rubber goods, such as (surgical) hand gloves, foot gloves, condoms, balloons or finger cots are manufactured according to processes comprising the dipping of a ceramic, porcelain or aluminum former or mold (having the shape of the intended good) into a rubber-containing emulsion and involves numerous successive manufacture steps such as described in U.S. Pat. Nos. 2,288,840, 2,434,035, 2,438,901, 2,451,759. The quality of the former or mold and its resistance are essential requirements for an efficient process, in particular to provide smooth, regular and high quality rubber goods. The fabrication of regular and high quality rubber goods is the goal of any rubber goods manufacturing process.

The drawbacks of molds (also designated as formers) as described in the prior art such as molds made of ceramic, porcelain or aluminum are that:
the rubber good may stick to the mold and the removal of the rubber good may be either laborious or may damage the final product which decreases productivity and yield, as well as product quality;
In case of mechanically inflicted damage of the ceramic, porcelain or aluminum mold—the production line has to be stopped for the molds to be replaced and therefore involve important consequences for the manufacturing process (e.g. delay/stop of rubber good production);
Some of the manufacturing process steps for making rubber goods involve strong chemicals which may be environmentally unfriendly and/or may deteriorate the mold after several cycles of use and after a certain period of time—the production line has to be stopped for the molds to be replaced and therefore involve important consequences for the manufacturing process (e.g. delay/stop of rubber good production)
the mold may lose its texture due to for instance scratching or wear due to normal industrial use.

Accordingly, there is a continuous need in the prior art to provide improved process which does not present the above mentioned drawbacks and/or to provide a mold which is more chemically resistant than the molds used in known processes and/or which can be used for a longer period of time and/or which is practical to use.

It is therefore a goal of the present invention, amongst other goals, to provide a process for the manufacture of rubber goods which does not present the above mentioned drawbacks, in other words, which limits the number of steps of the manufacturing process (by limiting the number of cleaning steps) or which comprises milder process steps, e.g. by comprising cleaning steps with weaker acid solutions and/or weaker base solutions. It is also a goal of the present invention to present a process which can be carried out for a longer period of time without replacing the mold because the mold is more resistant to chemical or mechanical damage. The above mentioned goals are reached by the process for manufacturing rubber goods according to the present invention which comprises dipping of a mold into a rubber (or rubber-containing) emulsion wherein the mold consisting of a plastic material having a surface tension in the range from 25 to 60 mJ/m$^2$ measured according to ASTM standard D-2578/09. The process according to the present invention may for example comprise the steps of:
i) cleaning the mold according to the present invention with one or more water-based solutions including one or more rinsing steps;
ii) brushing the mold;
iii) optionally rinsing the mold at least one time with water at ambient temperature or above;
iv) applying a coagulant solution or successively several solutions, comprising a salt dissolved in water, a mold release agent (such as a stearate-based component) and a wetting agent;
v) drying of the mold in an oven;
vi) followed by the dipping of the mold into a rubber-containing emulsion, to be understood as an emulsion comprising natural or synthetic rubber, or nitrile compositions (e.g. an emulsion of nitrile butadiene rubber latex or natural rubber latex), but the emulsion can also be a thermoplastic elastomer liquid (e.g. silicone, polyester, PVC) thereby forming a rubber good on the mold. In the context of the present invention, the rubber is to be understood as a rubber latex, made from for example natural rubber, isoprene rubber, neoprene or chloroprene rubber, vinyl rubber, isobutylene rubber, acrylonitrile butadiene or hydrogenated nitrile butadiene rubber or mixtures of these monomers such as styrene-butadiene rubber. Latex is the stable dispersion (emulsion) of polymer microparticles in an aqueous medium. It can be made synthetically by polymerizing a monomer such as butadiene that has been emulsified with surfactants. The rubber-containing emulsion also to be designated herewith by aqueous latex composition may additionally comprise additives such as stabilizers, waxes, anti-aging substances, viscosity regulators, fillers, pigments, sulfur, zinc oxide, organic accelerators.

In the context of the present invention, the terms "to comprise" or "comprising" are to be understood as 'to include' or 'including' in a non-limiting (non-exhaustive) way. In the context of the present invention, the terms "to consist of" or "consisting of" are to be understood as 'to include' or 'including' in a limiting (exhaustive) way.

According to the present invention, the mold used in the process consists of a plastic material comprising, or even consisting of a thermoplastic material comprising a polyamide component (thereby to be understood as a polyamide homopolymer, a polyamide copolymer or a blend of more than one polyamides, such as a blend of two polyamides, a blend of three polyamides, a blend of four polyamides or more). The mold as described in the context of the present invention does not have the drawbacks of the molds described in the prior art. For instance, in case the mold has lost its texture due to scratching, or due to normal wear in an industrial process, the mold made of plastic material as described in the present invention can be re-used after repair, such as after being retextured by sandblasting.

According to the present invention, the plastic material has a surface tension in the range from 25 to 60 mJ/m$^2$ measured according to ASTM standard D-2578/09; therefore, the mold used in the process also has a surface tension in the range from 25 to 60 mJ/m$^2$ measured according to ASTM standard D-2578/09. The surface tension of the plastic material is substantially determined by the polymer included in the plastic material with some contribution of fillers and/or additives if present in the plastic material. According to the present invention, the mold consists of a plastic material comprising, or even consisting of, a thermoplastic material comprising a polyamide component (thereby to be understood as a polyamide homopolymer, a polyamide copolymer or a blend of more than one polyamides, such as a blend of two polyamides or more). According to the present invention, the mold has a surface tension in the range from 25 to 60 mJ/m$^2$, advantageously from 35 to 60 mJ/m$^2$, more advantageously from 35 to 50 mJ/m$^2$, most advantageously from 25 to 45 mJ/m$^2$, measured according to ASTM standard D-2578/09 (which is used in the process) and consists of a plastic material comprising, or even consisting of a thermoplastic material comprising a polyarylene sulfide, preferably a polyphenylene sulfide (PPS) component (thereby to be understood as a polyphenylene sulfide homopolymer, a polyphenylene sulfide copolymer or a blend of more than one polyphenylene sulfide, such as a blend of two polyphenylene sulfide). In other words, the present invention advantageously relates to a mold or a method for making said mold, or a process for the manufacture of rubber goods using said mold, which mold is entirely made of the plastic material having a surface tension in the range from 25 to 60 mJ/m$^2$ measured according to ASTM standard D-2578/09. Preferably, the mold according to the present invention or used in the process according to the present invention does not comprise a ceramic premold, a metallic premold, a glass premold, or a premold not made of the plastic materials as defined herein. The mold defined in the present invention can comprise some inserts (such as metal inserts) or some parts for mechanical fixation or for holding the mold, when the mold is part of a production line, for example. The mold according to the present invention may in some cases consist of premold which is coated or overmolded with the plastic material according to the present invention, wherein the premold comprises, preferably consist of the plastic material as defined herein. The premold may consist of the same or a different plastic material (as defined herein) than the coating or overmolding layer, wherein the plastic material has, or provides a mold having, a surface tension in the range from 25 to 60 mJ/m$^2$ measured according to ASTM standard D-2578/09. In the context of the present invention the term "mold" is to be understood as a former, or a part or block with predetermined shape which shape will be provided to an article by dipping the mold into an emulsion of the material of said article. In other words, the article (i.e. rubber goods) will adopt the shape of the mold. In the context of the present invention, the term "premold" (or pre-former) is an intermediary part of a mold (which has the final desired shape). The premold has similar shape than the mold and is coated or overmolded to provide the mold. In the context of the present invention, when the mold (and/or the plastic material and/or the thermoplastic polymer or thermoset polymer present in the plastic material) has the surface tension as defined herewith, the above-mentioned advantages and effects of the mold or process for making rubber goods using such mold, are present regardless of the roughness of the mold. The mold has advantageously a roughness of at least 0.1 μm. The mold may have different roughnesses at different areas of the surface of the mold.

The plastic material advantageously is a thermoplastic material or thermoset material, in other words, the plastic material comprises a thermoplastic polymer or a thermoset polymer. The thermoplastic polymer can be selected from the group consisting of polyamides, polyesters, polyarylene sulfides, polyarylene oxides, polysulfones, polyarylates, polyimides, poly(ether ketone)s, polyetherimides, polycarbonates, copolymers of said polymers among each other and/or with other polymers, including thermoplastic elastomers, and mixtures of said polymers and copolymers. The thermoplastic material comprises, or even consists of, a thermoplastic polymer, optionally at least one filler as defined herein and/or at least one additive as defined herein. The thermoset polymer can be selected from the group consisting of a polyester resin, a polyurethane, bakelite, an epoxy resin, a polyimide, a cyanate ester (polycyanurate) and mixtures of said polymers and copolymers. The thermoset material comprises, or even consists of, a thermoset polymer, optionally at least one filler as defined herein and/or at least one additive as defined herein.

The plastic material can comprise a polyamide (homopolymer, copolymer or blend of two polyamides or more). The polyamide can originate from aliphatic dicarboxylic acids such as adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid and dimer fatty acid (C36), or from cycloaliphatic dicarboxylic acids such as cis- and/or trans-cyclohexane-1,4-dicarboxylic acid and/or cis- and/or trans-cyclohexane-1,3-dicarboxylic acid (CHDA). The polyamide can originate from an aromatic dicarboxylic acid, such as terephthalic acid, or isophtalic acid, which may be combined with a mixture of different aliphatic diamines. The dicarboxylic acid may comprise a combination of different dicarboxylic acids, for example terephthalic acid and isophthalic acid, or terephthalic acid and adipic acid, or terephthalic acid, adipic acid and isophthalic acid. Other aromatic dicarboxylic acids can be biphenyl-2,2'-dicarboxylic acid, naphthalenedicarboxylic acid (NDA). The above polyamides and/or the above copolyamides are obtained from diamines and dicarboxylic acids, wherein preferably, at least 60 mole % of dicarboxylic acids are aromatic dicarboxylic acids, more preferably at least 80 mole % of aromatic dicarboxylic acids, most preferably at least 90 mole % and wherein the mole % is relative to the total amount (mole) of dicarboxylic acid in the polyamide or copolyamide.

The polyamide can originate from aliphatic amines selected from the group consisting of: 1,4-butanediamine, 1,5-pentanediamine, 1,6-hexanediamine, 2-methyl-1,5-pentanediamine (MPD), 1,7-heptanediamine, 1,8-octanediamine, 1,9-nonanediamine, 2-methyl-1,8-octanediamine, 2,2,4-trimethylhexamethylenediamine, 2,4,4-trimethylhexamethylenediamine, 5-methyl-1,9-nonanediamine, 1,10-decanediamine, 1,11-undecanediamine, 2-butyl-2-ethyl-1,5-pentanediamine, 1,12-dodecanediamine, 1,13-tridecanediamine, 1,14-tetradecanediamine, 1,16-hexadecanediamine, 1,18-octadecanediamine. Preferred are 1,6-hexanediamine, 2-methyl-1,5-pentanediamine, 1,9-nonanediamine, 2-methyl-1,8-octanediamine, 1,10-decanediamine, and 1,12-dodecanediamine. The polyamide as recited above, may originate from cycloaliphatic diamines such as cyclohexanediamine, 1,3-bis(aminomethyl)cyclohexane (BAC), isophoronediamine, norbornanedimethylamine, 4,4'-diaminodicyclohexylmethane (PACM), 2,2-(4,4'-diaminodicyclohexyl)propane (PACP), and 3,3'-dimethyl-4,4'-diaminodicyclohexylmethane (MACM), or from aromatic diamines such as m-xylylenediamine (MXDA) and p-xylylenediamine (PXDA).

The polyamide can be an aliphatic polyamide or a semi-aromatic polyamide. The aliphatic polyamide is advantageously selected from the group consisting of PA 46, PA 410, PA 6, PA66, PA 610 and any copolymers thereof and blends thereof. Preferred, are polyamides selected from the group consisting of PA6, PA66 and PA610. More preferred are PA410, PA610, blends or copolymers thereof.

The semi-aromatic polyamide is advantageously selected from the group consisting of PA 4T, PA 4T/46, PA 4T/66, PA 4T/4I, PA 4T/4I/46, PA 4T/46/66, PA 4T/4I/66, PA 4T/56, PA4N, PA4BB, PA4CHDA, PA5T, PA5N, PA5BB, PA5CHDA, PA 5T/56, PA 5T/5I, PA 5T/66, PA6T, PA6N, PA6BB, PA6CHDA, PA6I, PA 6T/6I, PA 6T/66, PA 6T/610, PA 6T/612, PA 6T/11, PA 6T/6, PA 6T/10T, PA 6T/10I, PA 6T/106, PA 6T/1010, PA 6T/66/106, PA7T, PA8T, PA8I, PA9T, PA9I, PA10T, PA10N, PA10BB, PA10CHDA, PA10I, PA 10T/1010, PA 10T/1012, PA 10T/10I, PA 10T/12, PA 10T/11, PA 6T/MACM10, PA 6T/MACM12, PA 6T/MACM18, PA 6T/MACMI, PA MACMT/6I, PA 6T/PACM6, PA 6T/PACM10, PA 6T/PACM12, PA 6T/PACM18, PA 6T/PACMI, PACMT/6I, PA MPDT/MPDI, PA MPDT/MPD6, PA 6T/MPDI, PA 6T/9T, PA 6T/12T, PA 6T/6I/66, PA 6T/6I/6, PA 6T/6I/12, PA 6T/66/6, PA 6T/66/12, PA 6T/6I/MACMI, PA 6T/66/PACM6, PA11T, PA11I, PA12T, PA12I, PA MXD6, PA MXD10, PA PXD6, PA PXD10, any copolymers thereof and blends thereof.

More advantageously, the semi-aromatic polyamide is selected form the group consisting of PA4T, PA4I, PA4N, PA4BB, PA4CHDA, PA5T, PA5N, PA5BB, PA5CHDA, PA6T, PA6N, PA6BB, PA6CHDA, PA6I, PA7T, PA8T, PA8I, PA9T, PA9I, PA10T, PA10N, PA10CHDA, PA10I, PA11T, PA11I, PA12T, PA12I, PA MXD6, PA MXD10, PA PXD6, PAPXD10, PADT/DI, any copolymers thereof and blends thereof. In the context of the present invention, the above abbreviations as designated as follow: terephthalic acid (T), isophtalic acid (1), 4,4'-biphenyldicarboxylic acid (BB) and 2,6-naphthalenedicarboxylic acid (N), 1,4-trans-cyclohexanedicarboxylic acid (CHDA), methylpentyl diamine (D), meta-xylylenediamine (MXD), para-xylylenediamine (PXD). Semi-crystalline semi-aromatic polyamide can also be copolymers of the above-mentioned semi-aromatic polyamides (copolyamides). Such copolymers can have a melting temperature (Tm), for example with Tm above 260° C., particularly above 280° C.

The advantage of the plastic material being, or comprising, a polyamide (or a polyamide composition or polyamide component as described herewith), in particular a semi-crystalline semi-aromatic polyamide is that using such a plastic material allows the elaboration of complex mold structures, thereby allowing the manufacture of complex articles with said mold. Another advantage is that the articles can also have a higher thickness when the plastic material comprises semi-aromatic polyamide as described above. In other words, the semi-crystalline semi-aromatic polyamide-containing compositions (also designated as a plastic material containing a semi-crystalline semi-aromatic polyamide as defined above) used for making molds allow the fabrication of molds with improve the manufacturing process of complex and/or thick articles.

According to an embodiment of the present invention, the plastic material comprises, or even consists of, a polyamide or copolymer or blend thereof having a melting temperature or a glass transition temperature equal to or above 150° C. measured by DSC at a heating rate of 10° C./min in the second heating cycle according to standard ISO 11357-3 (2009), preferably a melting temperature or a glass transition temperature equal to or above 180° C., more preferably a melting temperature or a glass transition temperature equal to or above 200° C. Advantageous materials can also comprise a polyamide or copolymer or blend thereof having a melting temperature or a glass transition temperature equal to or above 220° C. measured by DSC at a heating rate of 10° C./min in the second heating cycle according to standard ISO 11357-3 (2009).

The plastic material can comprise a polyarylene sulfide polymer, such as any thermoplastic polyarylene sulfide polymer that is suitable for making molds for manufacturing rubber goods. Suitably the polyarylene sulfide polymer is a semi-crystalline thermoplastic polymer. Such a polymer can be characterized by its melting temperature. According to an embodiment of the present invention, the thermoplastic material comprises, or even consists of a polyarylene sulfide or copolymer thereof or blend thereof having a melting temperature equal to or above 150° C. measured by DSC at a heating rate of 10° C./min in the second heating cycle according to standard ISO 11357-3 (2009), preferably a melting temperature or a glass transition temperature equal to or above 180° C., more preferably a melting temperature or a glass transition temperature equal to or above 200° C. In a preferred embodiment of the invention the polyarylene sulfide has a melting temperature of at least 250° C. More preferably, the melting temperature is in the range of 270-340° C. Examples of suitable semi-crystalline polyarylene sulfides are polyphenylene sulfides and polybiphenylene sulfides. If the polyphenylene sulfide polymer has a melting temperature in the range of 270-340° C., said polyphenylene sulfide can be optionally blended with another polyarylene sulfide polymer, being either a semi-crystalline thermoplastic polyarylene sulfide polymer having a Tm lower than 270° C. and/or an amorphous thermoplastic polyarylene sulfide polymer.

According to the present invention, the plastic material may comprise a filler. Advantageously, the filler is a reinforcement filler, particularly in the form of fibers, preferably glass fibers with non-circular cross section (flat glass fibers), specifically oval, elliptical, cocooned (connection via the longitudinal sides of two or more round glass fibers), or rectangular or almost rectangular glass fibers. Such filler provides an increased stiffness and strength to the mold Flat glass fibers are preferably used are short glass fibers (chopped glass) with a flat shape and with a non-circular cross section, wherein the ratio of the mutually perpendicular cross-sectional axes is greater than or equal to 2, and the relatively small cross-sectional axes have a length equal to or above 3 μm. The glass fibers take in the form of chopped glass may advantageously have a length from 2 to 50 mm, and/or having a diameter of the small cross-sectional axis is from 3 to 20 μm and the diameter of the large cross-sectional axis is from 6 to 40 μm, wherein the ratio of the mutually perpendicular cross-sectional axes here (ratio of major cross-sectional axis to minor cross-sectional axis) is from 2 to 6 μm, preferably from 3 to 5 μm. The glass fiber reinforcing fillers may also be replaced by, or be present together with fillers selected from the group consisting of metals, of oxides, of borides, of carbides, or of nitrides, polytitanate, carbon, having a predetermined polygonal cross section, such as potassium titanate, aluminum oxide, silicon carbide having a diameter in the range from 0.1 to 10 μm, with a length from 1 mm to 1 cm. Other (further) fillers may be minerals, particularly preferably talc, mica, silicate, quartz, titanium dioxide, wollastonite, kaolin, amorphous silicas, magnesium carbonate, magnesium hydroxide, chalk, limestone, feldspar, barium sulfate, solid or hollow glass beads, ground glass, glass flakes, durably magnetic materials, such as magnetizable metal compounds, and/or alloys or mixtures thereof. The fillers can also have been surface-treated.

The reinforcement filler is preferably selected from the group consisting of glass fibers (such as E-glass, AR-glass, S-glass or Advantex) or a mineral filler. Advantageously, the filler within the meaning of the present invention includes any material that can be dispersed in the thermoplastic polymer. Other additives or processing aids such as impact modifiers, coupling agents, crystallization accelerators or crystallization retarders, flow aids, lubricants, mold-release agents, plasticizers, stabilizers, processing aids, flame-retardant additions, antistatic agents, pigments, dyes and markers, lamellar nanoparticles, conductivity additives, e.g. carbon black, graphite powder, or carbon nano-tubes, carbon-fibers, residues from polymerization processes, e.g. catalysts, salts, and derivatives of these, and also regulators, or a mixture thereof. The plastic material advantageously comprises 5-60 wt. %, of glass fibers, more particular 10-50 wt. %, even more particular 20-40 wt. %, relative to the total weight of the plastic material.

According to an embodiment of the present invention, the surface tension of the mold, or the surface tension of the plastic material itself, or the surface tension of the polymer in the plastic material is in the range from 25 to 60 mJ/m$^2$, measured according to ASTM standard D-2578/09, preferably in the range from 25 to 50 mJ/m$^2$ or from 20 to 45 mJ/m$^2$, more preferably in the range from 35-50 mJ/m$^2$, most preferably in the range from 35 to 45 mJ/m$^2$. The advantage of the plastic material, and/or the mold having such surface tension is that more regular rubber good can be produced. In other words, it is possible to reproducibly manufacture rubber goods with a smooth and constant in thickness which are therefore also stronger and more resistant to tear or wear. In the context of the present invention, when designating a range, the upper and lower limit 'from . . . to . . . " respectively are intended to be included in said range.

According to an embodiment of the present invention, the plastic material (therefore comprising a thermoplastic composition) comprises, or even consists of, a polyamide or copolymer thereof or blend thereof having a melting temperature or a glass transition temperature equal to or above 150° C. measured by DSC at a heating rate of 10° C./min in the second heating cycle according to standard ISO 11357-3 (2009), preferably a melting temperature or a glass transition temperature equal to or above 180° C., more preferably a melting temperature or a glass transition temperature equal to or above 200° C., which material may optionally contain a thermoconductive filler and/or at least one (further) additive.

According to an embodiment of the present invention, the thermoplastic material (therefore comprising a thermoplastic composition) comprises, or even consists of, a polyarylene sulfide or copolymer thereof or blend thereof having a melting temperature equal to or above 150° C. measured by DSC at a heating rate of 10° C./min in the second heating cycle according to standard ISO 11357-3 (2009), preferably a melting temperature or a glass transition temperature equal to or above 180° C., more preferably a melting temperature or a glass transition temperature equal to or above 200° C., even more preferably a melting temperature or a glass transition temperature equal to or above 220° C.

According to one embodiment of the present invention, the plastic material of the mold as defined herein, is a plastic composition comprising, or even consisting of:
a) a thermoplastic polymer as defined above, such as a polyamide or polyarylene sulfide, or a thermoset polymer as defined above, thermoplastic polymer or thermoset polymer having a surface tension in the range from 25 to 60 mJ/m$^2$ measured according to ASTM standard D-2578/09;
b) at least one reinforcement filler
c) at least one additive,
wherein a) can be present in an amount from 30 wt. % to 90 wt. %, b) can be present in an amount from 10 to 70 wt. %, and c) can be present in an amount ranging from 0 wt. % to 50 wt. %, relative to total weight of the plastic material.

The advantage of the mold made of the plastic material according to the present invention, is that in case the mold has lost its texture due to for instance scratching, or normal wear due to industrial use, the plastic mold can be repaired, or retextured by sandblasting and the mold can be further used. The industrial use several different steps which can cause wear. According to the process for manufacturing rubber goods recited herein, step i) can be any cleaning process which is suitable for cleaning the mold and obtain a smooth mold surface: such as one or more acid and/or basic wash. If step i) involves at least one acid and/or at least one basic wash, a rinsing step (into a water based solution) after each acid and/or basic wash can be carried out. In the process according to the present invention wherein the mold consisting of a plastic material having a surface tension in the range from 25 to 60 mJ/m$^2$ measured according to ASTM standard D-2578/09, the succession of steps: acid wash, water wash and base wash has to be carried out only once to provide a suitable cleaning of the mold. Further, the acid wash and base wash can be milder (i.e. no aggressive pH solution is used, such as extreme acidic or basic pH) than with the same process, if the mold is made of ceramic, porcelain or of any metal (alloy) such as aluminum. The mold according to the present invention is resistant to acidic and/or basic conditions, such as resistant to exposure at a pH values equal to or below 3, advantageously to pH values equal to or below 2, more advantageously at pH values equal to or below 1 and/or resistant to pH values equal to or above 11, advantageously pH values equal to or above 12, more advantageously to pH values equal to or above 13. In the above mentioned process, any of the steps can be carried out at temperature higher than ambient temperature, such as at a temperature equal to or above 30° C., at a temperature equal to or above 40° C., at a temperature equal to or above 50° C., at a temperature equal to or above 60° C., at a temperature equal to or above 70° C. The maximum temperature of any of the steps of the above-mentioned process is advantageously equal to or below 95° C., equal to or above 90° C., equal to or above 85° C. According to the above process, steps v) and vi) can be repeated one time, or more. Advantageously, any of the steps can be carried out at a temperature in a range as designated herein by the minimum of maximum temperatures, more preferably the range is from 70° C. to 90° C. The above process can also comprise at any stage between the above-mentioned steps, a pre-treatment step which allows to increase the adhesion or adherence of the rubber onto the mold. The above process can also comprise a curing step after step vi), wherein the rubber is heated to temperatures above 70° C. or higher to cure the rubber. Optionally, after the curing the rubber is chlorinated and/or neutralized. In the final step the rubber good is removed from the mold and the whole process is repeated. The process according to the present invention can also be applied in making dipped elastomer goods, such as polyester articles. The use of the mold according to the present invention further facilitates the removal of the rubber good, once the process is complete, without suffering damages to the final product which has to be removed from the mold. Accordingly, the above process can also comprise one or both of the two following steps:

vii) an optional curing step, when necessary as described in the prior art viii) removing the rubber good from the mold.

The above mentioned process can be carried out with additional steps comprising:

A drying step, and/or

At least one treatment step, such as a chlorination step, and/or

One or more neutralization steps, and/or

One or more rinsing steps.

Another aspect of the present invention relates to a mold (also designated as a former) as defined here above consisting of a plastic material (also designated as a plastic composition) comprising:

a) a polyamide or a polyarylene sulfide having a surface tension in the range from 25 to 60 mJ/m² measured according to ASTM standard D-2578/09;

b) at least one (reinforcing) filler c) at least one additive.

In the context of the present invention, under a) is to be understood as a polyamide component or polyamide composition which comprises at least one polyamide or at least one copolyamide, or a polyarylene sulfide component (or polyarylene sulfide composition) which comprises at least one polyarylene sulfide or copolymer of polyarylene sulfide. Under b) is to be understood as a filler as defined herein. Under c) is to be understood as at least one additive as defined herein. The mold according to the present invention is not only chemically resistant to aggressive (basic/acidic cleaning steps), but also resistant to high temperatures due to cleaning steps (e.g. drying), or during the process for making rubber goods and resistant to mechanical damage, due to cleaning steps (e.g. brushing).

According to one embodiment of the present invention, the mold can be made of the plastic material consisting of:

a) at least two polyamides wherein one polyamide is a semi-crystalline (semi-aromatic) polyamide and the second polyamide is an amorphous (semi-aromatic) polyamide, preferably the ratio between the semi-crystalline polyamide and amorphous polyamide is in the range from 1:5 to 200:, more preferably from 1:3 to 3:1, or from 1:2 to 2:1, most preferably 1:5, 1:1, 200:1;

b) at least one reinforcement filler c) optionally at least one additive.

Advantageously, the mold according to the present invention can be manufactured by MuCell molding. The advantage of manufacturing of the mold consisting of the plastic material comprising according to the present invention comprising both a semi-crystalline polyamide and an amorphous polyamide by Mucell technology is that a lighter weight material can be obtained.

In the context of the present invention, a) is a blend of at least two polyamides: a semi-crystalline semi-aromatic polyamide (sc-PPA) and an amorphous semi-aromatic polyamide (am-PPA). Herein the sc-PPA and the am-PPA can be used in amounts varying over a wide range.

With the term semi-crystalline polyamide is herein understood a polyamide that has crystalline domains as demonstrated by the presence of a melting peak with a melting enthalpy of at least 5 J/g. With the term amorphous polyamide is herein understood a polyamide that has no crystalline domains or essentially so, as demonstrated by absence of a melting peak or the presence of a melting peak with a melting enthalpy of less than 5 J/g. Herein the melting enthalpy is expressed relative to the weight of the polyamide.

With a semi-aromatic polyamide is herein understood a polyamide derived from monomers comprising at least one monomer containing an aromatic group and at least one aliphatic or cycloaliphatic monomer.

The semi-crystalline semi-aromatic polyamide suitably has a melting temperature around 270° C., or above. Preferably the melting temperature (Tm) is at least 280° C., more preferably in the range of 280 350° C., or even better 300-340° C. A higher melting temperature can generally be achieved by using a higher content in terephthalic acid and/or shorter chain diamines in the polyamide. The person skilled in the art of making polyamide molding compositions will be capable of making and selecting such polyamides.

Suitably, the semi-crystalline semi-aromatic polyamide has a melting enthalpy of at least 15 J/g, preferably at least 25 J/g, and more preferably at least 35 J/g. Herein the melting enthalpy is expressed relative to the weight of the semi-crystalline semi-aromatic polyamide.

Suitably, the semi-aromatic polyamide used in the present invention is derived from about 10 to about 75 mole % of the monomers containing an aromatic group. Accordingly, preferably about 25 to about 90 mole % of the remaining monomers are aliphatic and/or cycloaliphatic monomers.

Examples of suitable monomers containing aromatic groups are terephthalic acid and its derivatives, isophthalic acid and its derivatives, naphthalene dicarboxylic acid and its derivatives, C6-C20 aromatic diamines, p-xylylenediamine and m-xylylenediamine.

Preferably, the composition according to the invention comprises a semi-crystalline semi-aromatic polyamide derived from monomers comprising terephthalic acid or one of its derivatives.

The semi-crystalline semi-aromatic polyamide can further contain one or more different monomers, either aromatic, aliphatic or cycloaliphatic. Examples of aliphatic or cycloaliphatic compounds from which the semi-aromatic polyamide may further be derived include aliphatic and cycloaliphatic dicarboxylic acids and its derivatives, aliphatic C4-C20 alkylenediamines and/or C6-C20 alicyclic diamines, and amino acids and lactams. Suitable aliphatic dicarboxylic acids are, for example, adipic acid, sebacic acid, azelaic acid and/or dodecanedioic acid. Suitable diamines include butanediamine, hexamethylenediamine; 2 methylpentamethylenediamine; 2-methyloctamethylenediamine; trimethylhexamethylene-diamine; 1,8-diaminooctane, 1,9-diaminononane; 1,10-diaminodecane and 1,12-diaminododecane. Examples of suitable lactams and amino acids are 11-aminododecanoic acid, caprolactam, and laurolactam.

Examples of suitable semi-crystalline semi-aromatic polyamides include poly(m-xylylene adipamide) (polyamide MXD,6), poly(dodecamethylene terephthalamide) (polyamide 12,T), poly(decamethylene terephthalamide) (polyamide 10,T), poly(nonamethylene terephthalamide) (polyamide 9,T), hexamethylene adipamide/hexamethylene terephthalamide copolyamide (polyamide 6,T/6,6), hexamethylene terephthalamide/2-methylpentamethylene terephthalamide copolyamide (polyamide 6,T/D,T), hexamethylene adipamide/hexamethylene terephthalamide/ hexamethylene isophthalamide copolyamide (polyamide 6,6/6,T/6,I), poly(caprolactam-hexamethylene terephthalamide) (polyamide 6/6,T), hexamethylene terephthalamide/hexamethylene isophthalamide (6,T/6,I) copolymer, polyamide 10,T/10,12, polyamide 10T/10,10 and the like.

Preferably, the semi-crystalline semi-aromatic polyamide is a polyphthalamide, represented by the notation PA-XT or PA-XT/YT, wherein the polyamide is built from repeat units derived from terephthalic acid (T) and one or more linear aliphatic diamines. Suitable example thereof are PA-8T, PA-9T, PA-10T, PA-11T, PA8T/6T, PA4T/6T, and any copolymers thereof.

In a preferred embodiment of the invention, the semi-crystalline semi-aromatic polyamide has a number average molecular weight (Mn) of more than 5,000 g/mol, preferably in the range of 7,500-50,000 g/mol, more preferably 10,000-25,000 g/mol. This has the advantage that the composition has a good balance in mechanical properties and flow properties.

Examples of suitable amorphous semi-aromatic polyamides are PA-XI, wherein X is an aliphatic diamine, and amorphous copolyamides thereof (PA-XI/YT), such as PA-6I and PA-8I, and PA-6I/6T or PA-8I/8T (for example PA-6I/6T 70/30).

In the context of the present invention, the sc-PPA and the am-PPA are comprised by the polyamide composition in the following amounts:
a1) 20 99.5 wt. % of the semi-crystalline semi-aromatic polyamide and
a2) 0.5 80 wt. % of the amorphous semi-aromatic polyamide.

Herein the weight percentages wt, % are relative to the total weight of the polyamide component, and the sum of a1) and b2) is at most 100 wt. %.

Next to the sc-PPA and the am-PPA, the plastic material may comprise other components.

The plastic material comprising both the semi-crystalline polyamide and the amorphous polyamide allows more gas introduction during the MuCell molding process, resulting in molded articles having a better surface aspect and quality for high weight reduction (compared to standard injection molding manufacturing processes). Advantageous plastic materials (or thermoplastic compositions) according to the present invention consist of a) 50-80 wt. %, preferably from 50-70 wt. % of a semi-crystalline semi-aromatic polyamide and an amorphous semi-aromatic polyamide with a weight ratio in the range from 1:5 to 200:, more preferably from 1:3 to 3:1, or from 1:2 to 2:1, most preferably 1:5, 1:1, 200:1;
b) 10-60 wt. %, preferably 20-50 wt. % glass fibers;
c) 0-20 wt. %, preferably 1-10 wt. % of at least one additive or a filler as defined herein.

Herein the weight percentages wt,% are relative to the total weight of the plastic material, and the sum of a), b) and c) is 100 wt. %.

Advantageously, the semi-crystalline semi-aromatic polyamide can be chosen from a copolymer of PA6T as defined herein and the amorphous semi-aromatic polyamide can be chosen from a copolymer of PA6I as defined herein.

Accordingly, one aspect of the present invention is a plastic material. This aspect relates to polyamide compositions (or plastic materials) comprising at least one semi-crystalline (semi-aromatic) polyamide and/or at least one amorphous (semi-aromatic) polyamide. Preferably, the plastic material consists of:
a) at least two polyamides wherein one polyamide is a semi-aromatic semi-crystalline polyamide and the second polyamide is an amorphous polyamide
b) at least one reinforcement filler
c) optionally at least one additive.

The advantage of such plastic material is that it is particularly suitable for MuCell injection molding for manufacturing articles with a high weight reduction (compared to standard molding techniques).

According to this aspect of the present invention, the plastic material has a surface tension in the range from 25 to 60 mJ/m$^2$ measured according to ASTM standard D-2578/09, such as a plastic material consisting of 50-80 wt. % of a), 20 to 50 wt. % of b) and 0 to 10 wt. %, wherein the weight % are relative to the total weight (wt.) % of the plastic material. The polyamides can be selected from any of the above-mentioned polyamides as defined in the plastic material used in the context of the present invention. Preferred semi-crystalline semi-aromatic polyamides are selected from the group consisting of copolymers of PA6T, copolymers of PA9T and copolymers of PA10T. Copolymers of PA6T can be such as PA6T/66, PA6T/4T, PA6T/6I, PA6T/DT, PA6T/4T/66, PA4T/6T/66. Preferred amorphous semi-aromatic polyamides are selected from the group of PA6I, amorphous copolyamides of PA6I, PADT, PAMPDT and copolymers of PAMPDT. Copolymers of PA6I can be copolymers of PA6I/6T (such as PA6I/6T 70/30). Such compositions when part of a plastic material provide particularly suitable materials for manufacturing molds for making rubbers goods because the molds consisting of such materials are strong, particularly resistant to chemical exposure and/or heat exposure over an extended period of time.

Another aspect of the present invention relates to an article obtainable by MuCell molding comprising the plastic material as defined herein. An advantage of making the article by MuCell technology is that no weldline (in the article) is present. A further advantage of the article made of (comprise or even consists of) the plastic material defined herein is that if welding of the article is desired, the welding or weldline strength present is higher than with other materials.

Yet, another aspect of the present invention relates to a method for making an article, i.e. a mold or former consisting of the plastic material as defined herein, by introducing the plastic material into a mold. In other words, the present aspect of the present invention relates to a method for making the mold used in the process for manufacturing rubber goods according to the present invention, i.e. the present aspect relates to a method for making a mold consisting of the plastic material as defined here above, by introducing the plastic material into a mold. The introduction of the plastic material into the mold can be carried out by injection molding, injection molding using MuCell technology, resin transfer molding, blow molding, vibration welding, casting or compression molding. The present invention also relates to the method for making the above-mentioned mold as described herein comprising a polyarylene sulfide having a surface tension in the range from 25 to 60 mJ/m$^2$ preferably in the range from 35 to 60 mJ/m$^2$, preferably in the range from 35 to 50 mJ/m$^2$ measured according to ASTM standard D-2578/09 comprising a step of vibration welding or blow molding.

The plastic material is introduced into a mold for making the mold used in the process for making rubber goods according to the present invention. Said mold for making rubber goods has the desired shape, i.e. having the predetermined shape of the aimed rubber goods thereby making a premold consisting of the plastic material. The premold may be overmolded, welded (e.g. vibration welding, ultrasonic welding, laser welding), bonded using an adhesive, metallized, laser marked or coated.

All embodiments and preferences defined for the process according to the present invention are also applicable in the context of the mold and method for making the mold.

Rubber goods often require a complex shape of which a thin walled mold would be non-releasing in case the article needs to be made in a single shot (the rubber mold does not release from the cavity). In case a >1 cm walled releasing mold is made, the part will have sink marks and a bad surface quality. These problems can be avoided by welding two <1 cm walled releasing halves of the rubber glove mold that have been injection molded. Welding is designated as injection molding and consecutive, vibration welding, laser welding or ultrasonic welding. After welding, the flash of the weld-seam can be trimmed and polished or sandblasted to get a smooth mold surface. Blends of semi-crystalline polyamides with an amorphous polyamide and/or low aspect ratio fillers are advantageously solving this problem.

MuCell injection molding technology is particularly suited for plastic materials as described herein, because thick-walled products can be produced without sinkmarks and good surface quality. By "thick-walled" products is to be understood above 1 cm walled products. Blends of semi-crystalline polyamides with an amorphous polyamide (or low aspect ratio fillers), such as the blend of semi-crystalline semi-aromatic polyamide and amorphous semi-aromatic polyamide recited according to a preferred embodiment of the present invention, are advantageously processed using MuCell technology. MuCell molding can be used to prepare molds for rubber goods. Such molds for rubber goods can advantageously be rubber glove molds, in particular rubber glove molds where some of the fingers are >1 cm walled and have other thick parts with or without a retractable core in a single shot.

EXPERIMENTAL PART

Test Methods
Surface Tension
Surface Tension was measured on injection molded plaques of the compositions according to ASTM D-2578/09 "Standard test method for wetting tension of polyethylene and polypropylene films." Care was taken that the portion of the plaque to be tested was not touched or rubbed and was completely free of any contamination. A series of test solutions (mixtures of formamide and ethylene glycolmonoethyl ether) with gradually increasing surface tension were applied to the surface until a mixture was found that just wets the plaque surface. The solution was considered as wetting the test specimen when it remains intact as a continuous film for 2 seconds. The surface tension of this mixture was the determined wetting tension of the polymer plaque sample.

Sandblasting
The plaques were sandblasted using glass beads with a diameter from 0.2-0.8 mm for 3-6 minutes to reach the desired surface roughness $R_a$ of 4-6 μm. The applied pressure to the pneumatic sandblasting was approximately 2 bars.

Surface Roughness
The arithmetical mean surface roughness, $R_a$, was measured at 23° C. and 50% relative humidity using a Surftest SJ-310 with a stylus tip radius of 2 μm according to iso 4287-1997 and measured at 5 locations of the plaques. Only the plastic plaques with a surface roughness $R_a$ after sandblasting between 4 and 6 are used for the dipping experiments.

Dipping Procedure to Obtain a Rubber Film
The dipping procedure of the ceramic part was performed on a flat sandblasted 75×50×3 mm plaque of Ceramtec ceramic used for ceramic formers for rubber goods with an arithmetical mean surface roughness $R_a$ of 5.7 μm. The dipping procedure of the plastic compositions was performed on sandblasted injection molded plaques with an arithmetical mean surface roughness $R_a$ of 4-6 μm.

The 75×50×3 mm plaques were first cleaned according to the standard cleaning procedure. After the cleaning procedure the plaques are heated to 65° C. in an oven and were successively dipped into a water-based coagulant solution containing calcium nitrate for 10 seconds (4 seconds immerse, 2 seconds dwell and 4 seconds withdrawing time), mold release agent and wetting agent at 65° C. The pretreated plaques were then dried in an oven at 120° C. for 2 minutes and then dipped in a 30 wt % aqueous nitrile butadiene rubber latex at 60° C. for 17 seconds (7 seconds immerse, 3 seconds dwell and 7 seconds withdrawing time). The plaques where then placed upside down and kept rotating while placed in the oven at 120° C. for 20 minutes to cure and remove the excess water. The plaques were taken out of the oven and the rubber film was removed from the plaque.

The quality the rubber film was visually checked. This dipping procedure was performed three times for each example and comparative example. A good film quality means that in all three cases the rubber film did not show thickness variations or other defects when visually inspected. For example, when there was thinning, transparency to light differences are observed.

Cleaning Procedure

The cleaning procedure consist of an succession of steps involving an acid dip (aqueous HCl solution at pH 1 and 70° C. for 30 seconds), a water rinse, a basic dip (aqueous NaOH solution at pH 13 at 70° C. for 30 seconds), a water rinse and a water dip at 70° C. for 30 seconds.

Base Wash Resistance Test

The base wash resistance was tested by storing the 75×50×3 mm plaques for 72 hours in a hot sodium hydroxide aqueous solution at pH 13, at a constant temperature (70° C.). After this step the plaques were rinsed and soaked in hot demineralized water at a constant temperature (70° C.) for 24 hours and dried in the oven for 24 hours followed by the general cleaning procedure.

Acid Wash Resistance Test

The acid wash resistance was tested by storing the 75×50×3 mm plaques for 72 hours in an hot hydrochloric acid solution at pH 1 at a constant temperature (70° C.). After this step the plaques were rinsed and soaked in hot demineralized water at constant temperature (70° C.) for 24 hours and dried in the oven for 24 hours followed by the general cleaning procedure.

Drop Resistance Test

The plaques were dropped 5 times from 1 meter height on a horizontal concrete surface. After the drop the integrity of the plaques was visually checked.

Compounding

The glass filled compounds based on polyamides were prepared by melt mixing on a Berstorff ZE25/48 UTX (a co-rotating twin-screw extruder) operating at 350 rpm and using a wall temperature setting of Tm+20° C. All polymeric materials were fed to the feed-throat of the extruder and the standard 10 micrometer diameter glass fibers suitable for polyamides was fed downstream on the melt. The mean residence time of the molten polymers in the extruder was about 30 seconds Materials sc-PPA: semi-aromatic semi-crystalline polyamide based on 42.5 mole % terephthalic acid and 7.5 mole % adipic acid, 30 mole % 1,6-hexanediamine and 20 mole % 1,4-butanediamine, Tg 125° C. and Tm 325° C.; DSM.

am-PPA: semi-aromatic amorphous copolyamide polyamide PA6I/6T (50 mole % 1,6-hexanediamine, 35 mole % isophthalic acid and 15 mole % terephthalic acid), Tg 127° C.; DSM.

PA46: polyamide-46, homopolymer based on 1,4-butanediamine and adipic acid, Tg 90° C. and Tm 290° C., DSM.

PP: polypropylene—Hostacom G3N01L NC from Lyondell Basell

PPS: poly(p-phenylene sulfide), Tg 90° C. and Tm 280° C.—NHU-PPS G4010F from Zhejiang NHU Company Ltd.

GF: glass fibers, 10 micrometer diameter E-glass, CPIC ECS3014B-4.5.

Ceramic: Ceramtec ceramic

The following materials are used in the present Examples.

| Material | sc-PPA (wt. %) | am-PPA (wt. %) | PA46 (wt. %) | PPS (wt. %) | PP (wt. %) | Ceramic (wt. %) | GF (wt. %) | Tm (° C.) |
|---|---|---|---|---|---|---|---|---|
| M1 | — | — | — | — | — | 100 | — | — |
| M2 | — | — | — | — | 70 | — | 30 | 160 |
| M3 | 70 | — | — | — | — | — | 30 | 325 |
| M4 | 35 | 35 | — | — | — | — | 30 | 298 |
| M5 | 25 | 25 | — | — | — | — | 50 | 298 |
| M6 | — | — | — | 60 | — | — | 40 | 280 |
| M7 | — | — | 70 | — | — | — | 30 | 290 |
| M8 | 50 | — | — | — | — | — | 50 | 325 |

Preparation of the Nitrile Latex

In a 500 mL beaker 267 g of nitrile latex Synthomer X6311 (45% solid), 123 g distilled water to get 400 g solution (30% solid), 10.08 g of curing agent Octocure 2105 (N) and 3.86 g of TiO2 Octotint 705 were mixed and the pH was tuned to pH=10 using a 2 wt % NaOH solution. After mixing the solution was stirred for about 6 hours before the dipping.

Preparation of the Coagulant Solution

In a 500 mL beaker 52.6 g calcium nitrate solution Dipcal LQ, 6 g of coagulant Poly Coag-SR316, 0.32 g of surfactant Poly Surf-65 and 341.4 g distilled water were added and stirred for an hour, prior to use.

EXAMPLES

E1 to E10 are Examples according to the present invention.

CE1 to CE5 are Comparative Examples

Molds Made of Different Materials

TABLE 1 quality of rubber good manufactured with molds made of different materials

| Material | CE1 M1 | CE2 M2 | E1 M3 | E2 M4 | E3 M5 | E4 M6 | E5 M7 |
|---|---|---|---|---|---|---|---|
| Surface tension of the polymer compound (mJ/m$^2$) | Nm | 31 | 42 | 42 | 42 | 38 | 51 |
| Quality of rubber good before ageing | good | bad, thinning and pinholes | good | good | good | good | good |
| Surface quality of the mold after base wash resistance test | pitted/chipped surface | good, intact | good, intact | good, intact | good, intact | good, intact | cracked surface |
| Quality of rubber good after base wash resistance test | Bad, pinholes | bad, thinning and pinholes | good | good | good | good | medium, some pinholes |
| Surface quality of the mold after acid wash resistance test | good, intact | good, intact | good, intact | good, intact | good, intact | good, intact | cracked surface |
| Quality of rubber good after acid wash resistance test | good | bad, thinning and pinholes | good | good | good | good | medium, some pinholes |
| Drop test | bad, broken | good | good | good | good | good | good |

Legend: Nm—Not measured

MuCell Injection Molding Process

Two materials were tested: M5 and M8 (as described above).

Both materials were molded using standard injection molding (S) and using MuCell technology/molding (M). The MuCell technology was carried out in order to obtain a determined weight reduction: respectively 5 wt. %, 10 wt. %, 25 wt. %, 30 wt. % as indicated in the table below.

Materials M5 and M8 allowed molding thick parts by MuCell technology thereby obtaining an article without sink marks when using a small amount of injected gas, while for standard injection molded plaques, sink marks appear on the manufactured mold which also appear on the rubber good fabricated thereof.

The materials with an semi-crystalline polyamide and an amorphous polyamide are thus advantageously processed using MuCell technology: they can be processed while allowing a higher weight reduction and provide a better appearance article/mold than when the materials do only comprise a semi-crystalline polyamide (no amorphous polyamide).

When blending the sc-PPA with am-PPA, the weight reduction using MuCell molding without surface defects on the plaque is much higher when compared to using PPA. The rubber good resulting from the MuCell molded former according to E7, E8 and E9 are of good quality, thus better quality than by standard injection molding or when the Mucell molding is carried out with a material which does not comprise both sc-PPA and am-PPA.

Both standard and MuCell molding were performed on 75×50×20 mm plaque molds. The weight reduction was controlled by adjusting the amount of N2 injected into the melt. The dipping procedure of the plastic compositions was performed on sandblasted injection molded plaques with an arithmetical mean surface roughness Ra of 4-6 µm.

TABLE 2 quality of rubber good manufactured with molds made of different plastic materials and the maximum weight reduction when using MuCell molding without surface defects on the plaque.

| Material | CE5 M8 | CE6 M8 | CE7 M8 | E6 M5 | E7 M5 | E8 M5 | E9 M5 | E10 M5 |
|---|---|---|---|---|---|---|---|---|
| Standard (S) or MuCell (M) Molding | S | M | M | S | M | M | M | M |
| Weight reduction when performing MuCell molding (wt %) | 0 | 5 | 10 | 0 | 5 | 10 | 25 | 30 |
| Appearance molded plaque | sink marks | Good | bad, gas breaking through the surface | Sink marks | good | good | good | bad, gas breaking through the surface |
| Quality of rubber good | sink mark visible | good | bad, large pinholes | Sink mark visible | good | good | good | bad, large pinholes |

The invention claimed is:

1. A process for manufacturing a mold-formed rubber product comprising the steps of:
   (i) providing a mold which is formed of a plastic material having a surface tension in the range from 25 to 60 mJ/m² measured according to ASTM standard D-2578/09, wherein the plastic material is a thermoplastic material comprising a semi-crystalline semi-aromatic polyamide or copolymers thereof, or a blend comprising a semi-crystalline semi-aromatic polyamide, an aliphatic polyamide or copolymers thereof, or a blend comprising an aliphatic polyamide;
   (ii) roughening a surface of the mold to achieve a surface roughness (Ra) of between 4 and 6 µm;
   (iii) cleaning the mold surface with one or more water-based solutions including one or more rinsing steps;
   (iv) brushing the mold surface;
   (v) applying onto the mold surface a coagulant solution containing salt dissolved in water, a mold release agent and a wetting agent following by drying to thereby form a surface pretreated mold;
   (vi) drying the mold; and thereafter
   (vii) dipping the dried mold into a rubber emulsion to thereby provide on the mold the mold-formed rubber product.

2. The process according to claim 1, wherein the plastic material comprises a reinforcement filler.

3. The process according to claim 1, wherein the surface tension is in the range from 35 to 50 mJ/m² measured according to ASTM standard D-2578/09.

4. The process according to claim 1, wherein the plastic material is a thermoplastic material comprising a polyamide or a copolymer thereof, or a blend comprising a polyamide having a melting temperature or a glass transition temperature equal to or above 150° C. measured by DSC at a heating rate of 10° C./min in the second heating cycle according to standard ISO 11357-3 (2009).

5. The process according to claim 1, wherein the surface roughening step (ii) comprises sandblasting the mold surface.

6. The process according to claim 5, wherein the sandblasting comprises directing glass beads with a diameter of from 0.2-0.8 mm toward the surface of the mold.

7. The process according to claim 1, wherein the mold release agent of the coagulant solution comprises a stearate-based component.

8. The process according to claim 1, which further comprises the step of rinsing the mold at least once with water at or above ambient temperature.

9. The process according to claim 1, which further comprises the steps of:
   (viii) curing the rubber product on the mold; and thereafter
   (ix) removing the rubber product when cured from the mold.

* * * * *